(12) United States Patent
Bosworth et al.

(10) Patent No.: US 10,740,550 B1
(45) Date of Patent: Aug. 11, 2020

(54) NETWORK-ACCESSIBLE DATA MANAGEMENT SERVICE WITH WEB-OF-SHEETS DATA MODEL

(71) Applicant: Amazon Technologies, Inc., Seattle, WA (US)

(72) Inventors: Adam Bosworth, San Francisco, CA (US); Joseph Rozenfeld, San Carlos, CA (US); Tatyana Mamut, San Francisco, CA (US); Ian Scott Eslick, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/818,677

(22) Filed: Nov. 20, 2017

(51) Int. Cl.
*G06F 17/00* (2019.01)
*G06F 40/18* (2020.01)
*G06F 21/62* (2013.01)
*G06F 16/22* (2019.01)

(52) U.S. Cl.
CPC .......... *G06F 40/18* (2020.01); *G06F 16/2282* (2019.01); *G06F 21/6209* (2013.01)

(58) Field of Classification Search
None
See application file for complete search history.

(56) References Cited

U.S. PATENT DOCUMENTS

| | | | |
|---|---|---|---|
| 5,255,356 A | 10/1993 | Michelman et al. | |
| 5,371,675 A | 12/1994 | Greif et al. | |
| 5,604,854 A | 2/1997 | Glassey | |
| 6,157,934 A * | 12/2000 | Khan | G06Q 10/10 709/203 |
| 6,631,497 B1 | 10/2003 | Jamshidi et al. | |
| 6,988,241 B1 | 1/2006 | Guttman et al. | |
| 8,146,000 B1 * | 3/2012 | Boliek | G06Q 10/0633 705/348 |
| 8,812,625 B1 * | 8/2014 | Chitilian | H04L 29/08981 707/802 |
| 10,073,844 B1 * | 9/2018 | Grzech | G06F 11/1469 |
| 2002/0065846 A1 * | 5/2002 | Ogawa | G06F 17/246 715/205 |
| 2006/0069696 A1 * | 3/2006 | Becker | G06F 17/246 |
| 2007/0130511 A1 * | 6/2007 | Roberge | G06N 5/02 715/204 |
| 2007/0136666 A1 * | 6/2007 | Khen | G06F 17/246 715/217 |

(Continued)

OTHER PUBLICATIONS

Google, "IMPORTRANGE—Docs editors Help," downloaded from https://support.google.com/docs/answer/3093340 on Oct. 4, 2017, pp. 1-3.

(Continued)

*Primary Examiner* — Mustafa A Amin
(74) *Attorney, Agent, or Firm* — Robert C. Kowert; Kowert, Hood, Munyon, Rankin & Goetzel, P.C.

(57) ABSTRACT

At a data management service, a child template associated with a parent group of one or more cells of a first data sheet is stored. In response to detecting that a parent cell has been added to the parent group, a particular child data sheet is instantiated automatically in accordance with the template. In response to a change to a value in a first cell of the child data sheet, a corresponding value of a cell of the first data sheet is modified.

20 Claims, 12 Drawing Sheets

(56) References Cited

U.S. PATENT DOCUMENTS

| | | | |
|---|---|---|---|
| 2008/0005658 A1* | 1/2008 | Benhase | G06F 17/245 715/234 |
| 2008/0162532 A1* | 7/2008 | Daga | G06F 17/30554 |
| 2010/0169759 A1* | 7/2010 | Le Brazidec | G06F 17/246 715/219 |
| 2011/0087954 A1* | 4/2011 | Dickerman | G06F 17/246 715/219 |
| 2014/0157098 A1* | 6/2014 | Maresca | G06F 17/246 715/219 |
| 2017/0255596 A1* | 9/2017 | Rochelle | G06Q 10/107 |
| 2018/0181378 A1* | 6/2018 | Bakman | G06F 8/38 |
| 2019/0012308 A1* | 1/2019 | Dvorak | G06F 17/2282 |

OTHER PUBLICATIONS

Microsoft, "Overview of Excel tables," downloaded from https://support.office.com/en-us/article/Overview-of-Excel-tables-7abObb7d-3a9e-4b56-a3c9-6c94334e492c on Oct. 2, 2017, pp. 1-6.

Microsoft, "Work with hyperlinks in Excel," downloaded from https://support.office.com/en-us/article/Work-with-hyperlinks-in-Excel-7fc80d8d-68f9-482f-ab01-584c44d72b3e on Oct. 3, 2017, pp. 1-9.

* cited by examiner

Cell 506 →

Column P

Row Q | =KM[DN]*sqrt[AB]

Formula 515 in which cell [DN] of child sheet is referenced by using parent cell's (col.row) identifier (KM)

Cell 505 →

Column K (parent cells)

Row M | ◇P

Symbol 510 indicating cell is a parent with a child sheet

FIG. 5

NETWORK-ACCESSIBLE DATA MANAGEMENT SERVICE WITH WEB-OF-SHEETS DATA MODEL

BACKGROUND

As collecting and storing data from a variety of sources has become easier and cheaper in recent years, business decisions are increasingly being made in a data driven manner. Over recent decades fairly sophisticated data processing applications have been developed using databases of various types, including traditional relational databases, object-oriented databases, non-relational or "NoSQL" databases, and the like. In some cases, such data processing applications have been designed to handle millions of even billions of data records.

Typically, developing and changing applications that rely on database systems is a non-trivial exercise, usually involving teams of programmers and long development cycles. Large well-financed organizations may be able to hire enough programming staff to develop and maintain the applications for various target environments, or outsource the work of developing and maintaining the applications. However, for a "long tail" of relatively small teams or individuals, the costs associated with developing full-fledged data management applications using conventional database systems may sometimes be prohibitive. Furthermore, interacting with the database applications may sometimes require expertise in languages (such as various versions of the Structured Query Language in the case of relational databases) in which expertise may sometimes be lacking in small teams.

In contrast to large and complex database systems, spreadsheet applications offer an easier-to-use approach towards managing data. Spreadsheets offer a tabular view of data, often with fewer restrictions (for example on the types of data that can be stored in a given row or column) than database systems, and allow many common types of calculations to be performed on data sets using formulas that are relatively easy to understand and modify. However, as the size of the data sets to be managed increases, especially in scenarios in which hierarchical and relational associations between different sets of data need to be incorporated into the applications, some traditional spreadsheet programs may not necessarily work well.

BRIEF DESCRIPTION OF DRAWINGS

FIG. 5 illustrates an example formula in which cells of a child sheet may be referenced via a parent cell, according to at least some embodiments.

Figure 1:
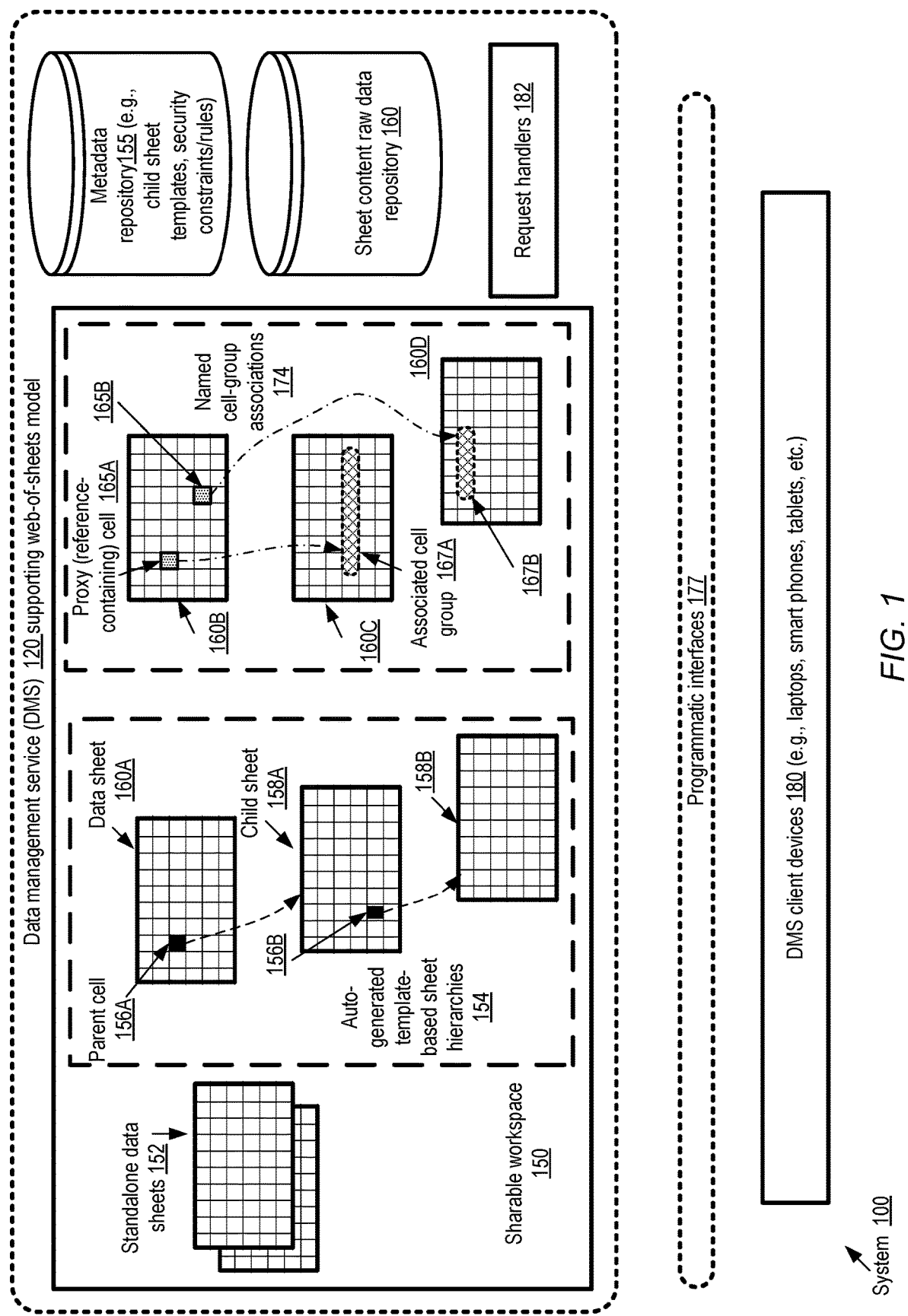
FIG. 1 illustrates an example system environment in which a data management service supporting a web-of-sheets data model may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for supporting a rich data model for data elements presented to users in the form of logically linkable two-dimensional cell grids or "data sheets" are described. Among other features, the data model may, for example, support automatic instantiation of child data sheets based on templates or example data provided by users, as well as the representation of invariant associations between proxy cells and groups of other cells. These and other features of the data model and its associated formula language may simplify several types of computations, such as computations involving automatic update propagations between sheets of a hierarchy or between cells linked by cell group associations. The data model may be referred to in some embodiments as a "web-of-sheets" model, as the kinds of rich and easy-to-navigate relationships between groups of data elements that are enabled by the data model may be considered somewhat analogous to the kinds of relationships that may exist between documents or pages of the world wide web.

In at least some embodiments, one or more of the techniques described herein may be implemented at a network-accessible data management service, which in turn may be implemented at a provider network or cloud computing environment. A customer or client of such a service, such as a businessperson who may not necessarily be skilled in at least some aspects of database management but may be somewhat familiar with commonly-available spreadsheet programs, may utilize the service from several types of front-end programs running on a variety of client-side devices such as mobile phones, tablet computers, laptops, desktops and the like. The data entered into the cells of a given data sheet may be stored at one or more storage servers at a data center, and various techniques to support high levels of availability, durability and the like may be implemented transparently; that is, a user of the data management service may not necessarily be aware of the specific algorithms and devices used to store and protect the data. Individual users or groups of users of the data management service may set up shared workspaces in some embodiments, and workbooks comprising one or more data sheets may be created within a workspace at the request of a user. The term "user" and "client" may be used interchangeably with respect to embodiments in which the data model is supported at a network-accessible service.

According to some embodiments, in response to one or more programmatic interactions, the data management service may store a representation of child template associated with a parent group of one or more cells of a first data sheet. For example, a logical table T1 with several columns C1, C2, C3, . . . , may be defined in a particular data sheet DS1 in one embodiment, and the cells of C1 may be designated as parent cells, such that whenever a new entry is added in column C1, a corresponding child data sheet with properties indicated in a child template CT1 is created automatically. (In various embodiments, a logical table may comprise some number of rows and columns that are formatted and managed independently from other rows and columns of a data sheet.) The data sheet (DS1 in the above example) comprising the parent cells (the cells of column C1) may be referred to as a parent sheet in various embodiments. Properties indicated in a child template may, for example, include a name to be assigned to the child sheet, names of various rows and/or columns of the child sheet (or a child logical table T2 within the child sheet), formulas to be used to populate the cells of the child sheet, rules or constraints regarding the automatic propagation of data to/from the child sheet, and so on. For example, in one embodiment, a "copy-up" rule may allow data that is entered into selected cells (or any cell) in a child sheet to be propagated to the parent data sheet (e.g., to update cells whose formula refers to data in the child sheet), while a "copy-down" rule may allow data that is entered into selected cells (or any cells) in a parent data sheet to be propagated to a child sheet. Rules may also be specified to indicate permissions granted to various entities (e.g., users or groups of users) to read/create/modify cells in the child sheet, which parts of a given data sheet should be hidden from viewers/modifiers of the parent data sheet, and so on. In at least some embodiments, by default, until the user specifies the properties by providing examples or entering the properties into a form-like interface, a template may not necessarily contain any specified properties to begin with.

In at least some embodiments, a lazy materialization technique may be used when creating child sheets—e.g., in response to the entry of a new value (or the creation/insertion of a new cell) in a parent cell column, an empty child sheet may be instantiated, and the child sheet may not necessarily be populated with data or row/column labels until the child sheet is accessed or modified. In effect, in various embodiments, when a parent cell is populated or created, this may initially be interpreted simply as an intent to create a child sheet, and the child sheet itself may be materialized or populated later, when an intent to display or to enter data into the child sheet is discerned. In some embodiments, a graphical indication may be provided that a given cell is a parent cell—e.g., a special symbol, font, color or the like may be used for parent cells. In at least some embodiments, in accordance with the granted permissions, cells of a child sheet may be referred to using references to the parent cell of the child sheet. For example, if the parent cell is identified by a [row, column] combination [r1, c1], the contents of the cell in position [r2, c2] in the child sheet may be referenced using a notation similar to =[r1, c1][r2, c2].

In at least some embodiments, a hierarchy comprising multiple levels of child sheets may be defined. As a result, in such embodiments, multiple child sheets may be created and initialized automatically at different levels of the hierarchy based on templates created on behalf of a data sheet user. Such a feature may allow applications which may potentially have to process large amounts of data to be scaled automatically, with thousands or even tens of thousands of data sheets created, populated, managed and accessed relatively easily. From a given parent sheet, multiple instances of multiple types of child sheets may be created in some embodiments; that is, branching may be supported in the hierarchy. Any desired type of content that can be represented using a grid of cells may be stored in a given sheet at any level of the hierarchy in various embodiments.

According to one embodiment, in addition to or instead of enabling a hierarchy of child sheets to be created and used, logical associations or relations between groups of cells may be created and used by clients of the data management service. For example, with respect to a group of cells CG1 within a particular data sheet DS1 (such as a particular row R1 of a logical table LT1 of DS1), a unique hidden immutable object representing an identifier or key K1 of the CG1 cells collectively may be generated in response to input from a client. A proxy or referring cell RC1, e.g., in a different sheet DS2 or in the same sheet DS1, may be assigned the hidden key K1 in some embodiments; internally, at the storage servers of the data management service, K1 may be stored as the content of RC1. The proxy cell may be referred to as a "row link" cell in some embodiments, e.g., to indicate that there is a logical link or association between it and at least a row of other cells. The displayed content of RC1 (i.e., the content visible to users) may be derived from some combination of content of one or more cells of CG1 in some embodiments, e.g., based on a display formula or specification indicated by the client on whose behalf the association is created. Formulas that refer to the contents of the associated cells may be expressed via the row link cell in some embodiments. For example, if one of the cells in a row of cells which form the associated cells CG1 contains a value for an "Age" column, and RC1 is at cell [r1, c1], in one implementation the age value from CG1 may be obtained using a notation similar to =[r1, c1][Age]. In some embodiments, a graphical indication may be provided that a given cell is a proxy cell—e.g., a special symbol, font, color or the like may be used for parent cells. The hidden key may be considered immutable or invariant in that even if the group of associated cells such as CG1 is moved (e.g., as a result of re-sorting a table of which CG1 forms a row), the references to CG1 via RC1 may remain unaffected in various embodiments. Once an association has been created, the data management service may be responsible for keeping track of the association regardless of the position or location of the associated cell group in various embodiments. In some embodiments, some types of operations may not be permitted, at least by default, on the set of associated cells—e.g., deleting the associated cells may be impermissible, or a warning message may be generated if such a deletion is attempted.

In at least some embodiments, fairly complex relationships between various data elements or records may be established using the combination of hierarchical and cell group association features similar to those described above. For example, a hierarchy may comprise thousands of data sheets, and logical associations may potentially be created among large numbers of cells and cell groups. In some such embodiments, the data management service may provide a summary visualization of the relationships within a given workspace, e.g., indicating how many sheets there are at various levels of the hierarchy, the association relationships that have been created for various groups of cells, and so on. Such a summary view may be provided, for example, in response to a programmatic query, and details of various parts of the web of sheets may be obtained in response to "zoom-in" requests and the like in some embodiments.

In addition to the core ability to easily model hierarchical relationships and permanent associations among cells, the web-of-sheets model may provide several additional practical benefits in various embodiments. Respective security or access sharing settings may be set up for the different sheets in a workspace, for example, enabling a cleaner separation of rights and responsibilities among the appropriate set of collaborating users/groups than if the users all had to share access to a single large data sheet. Locking of data at the cell level or row level, which may be inefficient and inconvenient for collaborating users, may not be required if the data is spread across a hierarchy or "network" of linked of sheets using the features of the web-of-sheets model.

The web-of-sheets model may also make it easier to parallelize at least some types of recalculation operations in at least some embodiments. Recalculation or "recalc" operations may be needed when, for example, the formulas for various cells of one or more sheets are defined in such a way that a change to a value in some set of cells triggers changes to the values in one or more other sets of cells. The dependency trees for some recalculation operations may be fairly complex. As a result of distributing the data of an application among a hierarchy of sheets and/or linked sheets, it may become easier to perform some recalculations in parallel. Consider a scenario in which an application's data is distributed among a three-level hierarchy of sheets, L1, L2 and L3, such that some recalculation dependencies exist between the L3 and L2 levels and other recalculation dependencies exist between the L2 and L1 levels. Depending on the nature of the application, calculations involving dependencies among respective pairs of sheets at the L3 and L2 layers may be performed in parallel in such a scenario, and similarly, calculations involving dependencies among respective pairs of sheets at the L2 and L1 layers may be performed in parallel. As a result, the total time needed to perform a complex recalculation may be reduced.

In contrast to at least some spreadsheet applications, in which some data sheets may only be reached by clicking on tabs, the web-of-sheets model may enable a more intuitive navigation method (similar to navigation among pages of the world-wide web) for accessing logically related sets of cells in various embodiments. For example, in at least some embodiments, a user may navigate to a child sheet simply by clicking on a parent cell, and navigate back to the parent sheet if desired by clicking on a parent-proxy cell in the child sheet; clicking on tabs may not be required. Proxy cells may also be used to navigate among groups of cells which are not hierarchically related in various embodiments.

In at least some embodiments, a number of programmatic interfaces may be implemented by the data management service, such as one or more web-based consoles, application programming interfaces (APIs), command-line tools, and/or graphical user interfaces that can be used to manage and interact with the workspaces and their data sheets. In at least one embodiment, one or more APIs may enable the bulk uploading or transfer of data into data sheets, e.g., from a stream of incoming data records or from legacy data stores.

In various embodiments, in addition to the support for hierarchical or association relationships, the data management service may also support the use of standalone data sheets or workbooks with common spreadsheet-like capabilities such as charts, data analysis tools such as sorts/pivot tables, and the like. That is, the hierarchical and logical association capabilities offered by the service need not be used by some clients for whose applications baseline spreadsheet capabilities are sufficient. In various embodiments, standalone data sheets may be combined, within a given workspace, with automatically-generated sheet hierarchies and/or sheets containing logical links to associated groups of cells.

Example System Environment

FIG. 1 illustrates an example system environment in which a data management service supporting a web-of-sheets data model may be implemented, according to at least some embodiments. As shown, system 100 includes resources of a data management service (DMS) 120 which may be used to support several different types of data sheets within sharable workspaces 150. A data sheet may comprise a grid of cells arranged in rows and columns; data sheets may also be referred to as worksheets in some embodiments. In one embodiment, collections of one or more data sheets may be referred to as workbooks, with individual workbooks being stored as respective files, and individual data sheets being accessed from within a workbook, for example, via tabs or similar interfaces. To simplify the presentation, workbooks are not discussed further in much of the subsequent description, and are not shown in the figures; instead, the discussion is framed largely in the context of data sheets.

One or more sharable workspaces 150 may be established on behalf of a given DMS client in the depicted embodiment, e.g., in response to requests submitted from a client device 180 (such as a laptop, a smart phone, tablet or the like) via programmatic interfaces 177. The requests may be received and handled by one or more request handlers 182 implemented at one or more computing devices in the depicted embodiment. The client on whose behalf a workspace is created (or other entities to whom the client delegates responsibilities) may be responsible for setting up permissions associated with sharing the workspace—e.g., read, write, modify, delete, and other permissions with respect to the workspace 150 or individual sheets/workbooks may be granted to other clients as desired. In at least some embodiments as discussed below, templates used to create child sheets may include some types of security-related properties as well.

A given workspace 150 may comprise, for example, one or more standalone data sheets 152 as well as least two types of groups of logically related data sheets in the depicted embodiment. An auto-generated template-based sheet hierarchy, such as hierarchy 154, may be created on behalf of authorized users in some embodiments. In addition, named cell-group associations 174 (which may also be referred to as row links) may be generated and stored in some embodiments.

In at least one embodiment, a client may designate one or more cells of a given data sheet 160A, such as a column containing cell 156A, as parent cells. Such a designation may imply that if and when a new parent cell is added (or data is entered into a previously blank parent cell), one or more child sheets such as child sheet 158A is to be instantiated automatically by the DMS 120 in the depicted embodiment. A sheet such as 160A containing one or more parent cells may be referred to as a parent sheet in some embodiments; note that a data sheet may be both a parent sheet and a child sheet in at least some embodiments. Child sheets may also be referred to as details sheets in one embodiments, as they may often include supporting details about data that is summarized in the parent sheets. The properties of the child sheet may be specified by the DMS client, e.g., by providing names and/or formulas for various cells of the child sheet, and/or by providing example cell contents for the child sheet which can be extrapolated/generalized by the DMS. Properties of the child sheet may be stored in the form of persistent metadata objects called templates in some embodiments, which may be stored along with various other administrative information in a metadata repository 155.

Multi-level hierarchies of parent and child data sheets may be generated automatically based on templates in some embodiments—e.g., sheet 158A may be created as a child sheet of parent cell 156A of sheet 160A, sheet 158B may be created as a child sheet of parent cell 156B of sheet 158A, and so on. In at least some embodiments, a lazy or on-demand materialization strategy may be used for child sheets—e.g., while a new child sheet may be logically instantiated as soon as data is entered into a parent cell (or as soon as a new parent cell is created), the memory/storage to be used for data of the child sheet may not necessarily be allocated until the child sheet is accessed or navigated to.

Rules regarding the accessibility of data among the sheets of a hierarchy may also be stored in the metadata repository 155 in at least some embodiments—e.g., such rules may indicate which portions of a child sheet are to be accessible from a parent sheet and vice versa, which updates to a child sheet are to be propagated to parent sheets and vice versa, etc. In at least some embodiments, for example, depending on the rules set up, when a value of a cell in a child data sheet (such as 158A or 158B) is modified, a corresponding child-dependent value may be updated in one or more parent sheets. The raw data for various cells (e.g., data that is not computed and updated automatically based on values of other cells) may be stored in a separate repository 160 in the depicted embodiment.

In addition to hierarchical relationships such as those between parent cells and child sheets, in at least some embodiments the DMS 120 may enable the creation of logical associations (which may also be referred to as "row links") between groups of cells and referring cells (which may also be termed proxy cells). For example, proxy cell 165A of sheet 160B may be associated with a cell group 167A of sheet 160C, while proxy cell 165B of sheet 160B may be associated with cell group 167B of sheet 160D in the depicted example scenario. In order to store persistent information about such associations, in the depicted embodiment a component of the DMS 120 may generate a respective immutable or invariant object, such as a hidden key, representing the association between the proxy cell (e.g., 165A) and the group of associated cells (e.g. 167A). The object may be invariant in that the association may remain valid (and results obtained from formulas referring to the associated cells, expressed using the identifier of the proxy cell, may remain unchanged) regardless of whether the group of associated cells is moved around, e.g., as a result of sorting or other operations in sheet 160C or 160D. The proxy cells which are associated with groups of other cells may also be referred to as row-link cells in at least some embodiments. In at least one embodiment, when creating a logical association, the target group of cells with which a proxy cell is to be associated may be identified using a search interface. For example, to indicate that a search is to be conducted, a client may type in the first few letters or numerals of a value stored in the targeted group of cells, and the data management service may indicate cells whose contents match the first few letters or numerals. The client may then pick one of the search results (and some number of adjacent cells, if desired) as the cell group for the proxy cell.

In at least some embodiments, parent cells and/or proxy cells may be distinguished from other cells within data sheets using, for example, a special symbol, font or color scheme. In one embodiment, a menu element (such as a drop-down menu option) may be employed by a client to designate that a particular cell is a parent cell or a proxy cell. The specific values/labels that are displayed within the parent cells and/or the row-link cells may be selected or specified by clients in some embodiments. Various additional aspects of hierarchical and cell group association relationships are discussed below in further detail.

Child Sheets

Figure 2:
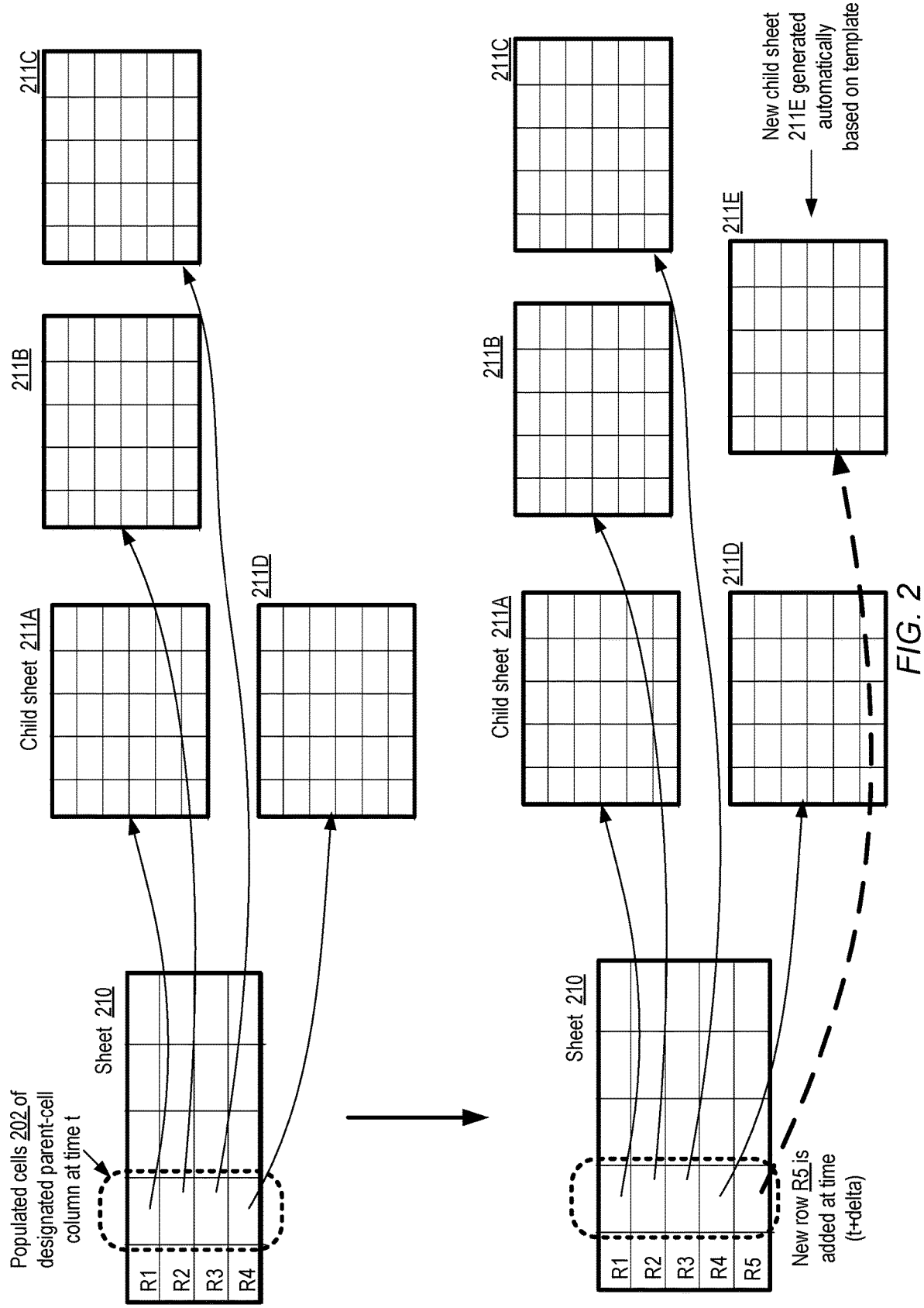
FIG. 2 illustrates an example of the automatic instantiation of a child data sheet in response to addition of data in a parent column, according to at least some embodiments.

FIG. 2 illustrates an example of the automatic instantiation of a child data sheet in response to addition of data in a parent column, according to at least some embodiments. In the depicted embodiment, cells 202 of a particular column within sheet 210 have been designated as parent cells, for which respective child sheets 211 are to be created automatically by the data management system.

At a particular time t, as shown in the upper portion of FIG. 2, four of the cells of column 202 (in rows R1, R2, R3 and R4) have already been populated. As a consequence, respective child data sheets 211A, 211B, 211C and 211D have been instantiated, one each for the four parent cells.

At some later time (t+delta), a new row R5 is added/inserted to the parent sheet 210, as shown in the lower portion of FIG. 2. As a result of the designation of column 202 as parent cells, the data management system detects the creation of the new parent cell, and generates a new child sheet 211E automatically in the depicted embodiment. As mentioned above, in at least some embodiments an empty child sheet may be instantiated, with the cells of the child sheet being left unpopulated until a user navigates to the parent cell or to some cell of the child sheet. In some cases, allocation of memory/storage for the cells of the child sheet may be deferred until a user navigates to the parent cell or the child sheet.

Child Sheet Metadata

Figure 3:
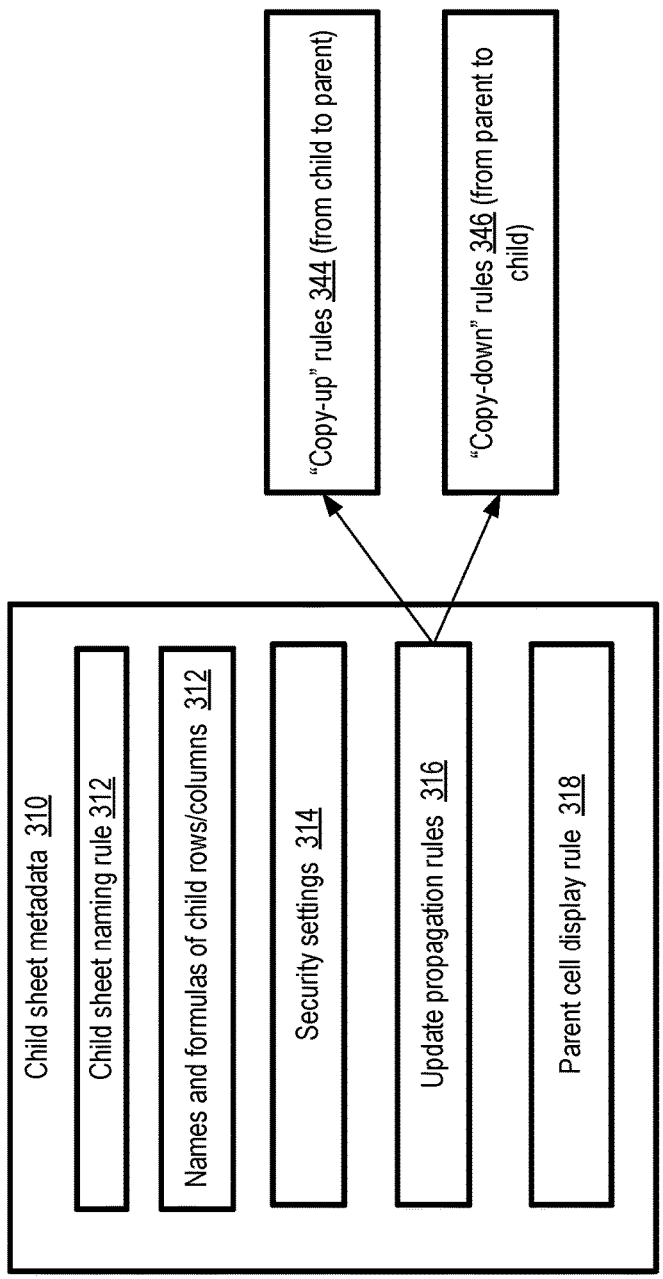
FIG. 3 illustrates example contents of metadata which may be used to create child data sheets, according to at least some embodiments.

FIG. 3 illustrates example contents of metadata which may be used to create child data sheets, according to at least some embodiments. As shown, metadata 310 used may comprise a child sheet naming rule 312, names and formulas 312 of columns/rows of the child sheet, security settings 314, update propagation rules 316, and/or a parent cell display rule 318 in the depicted embodiment.

The child sheet naming rule 312 may indicate how the child sheet is to be referred to from elsewhere in the workspace or the parent sheet. For example, in some embodiments, at the request of the client, each child sheet may be given a unique name selected by the client, such as "Pki-EventDetails" where the "Pki" component of the name indicates that the parent cell is in the $i^{th}$ row and the $k^{th}$ column of a parent sheet P, and the "EventDetails" portion indicates that the child sheet contains details regarding an event summarized in the parent sheet. In other embodiments, the child sheet may simply be referred to by default using the parent cell as an indirect identifier or pointer, and no unique name may be generated by the service.

Names and formulas 312 for various columns and/or rows of the child sheet may be specified by the client (e.g., by example) and stored as part of the metadata 310 in some embodiments. For example, a client may create a logical table within a particular data sheet DS-C, with various named columns and associated formulas, and then designate a cell of another sheet DS-P as a parent cell for DS-C, thereby providing the column names by example in one embodiment. In another embodiment, the names and/or formulas may be entered via a form-like interface.

Security settings 314 may indicate, for example, the entities (e.g., users or groups registered in an identity management system used by the data management service) which are granted various types of access permissions to all or part of the child sheet in the depicted embodiment. In some embodiments, the security settings may also indicate portions of the child data sheet whose values are to be "locked" (i.e., designated as unmodifiable). In one embodiment, security settings 314 may also be used to indicate whether a subset of a parent sheet is to be hidden to viewers/editors of the child sheet.

Update propagation rules 316, which may be part of the security settings 314 in some embodiments, may indicate whether, and in which directions, updates made to a child sheet or a parent sheet are to be propagated automatically. For example, for some portions of a child sheet, a copy-up rule 344 may indicate that whenever a change is made to a value in those portions of the child sheet, any cells of the parent sheet which refer to those child cells are to be updated automatically. Similarly, with respect to some portions of a parent sheet, a copy-down rule 344 may indicate that whenever a change is made to a value in those portions of the parent sheet, any cells of the child sheet which refer to those parent cells are to be updated automatically.

A parent cell display rule 318 may indicate how the values or labels to be displayed in the parent cell are to be determined. For example, in some embodiments, an abbreviated version of the name of the child sheet may be displayed within the parent cell. In other embodiments, a portion of the contents of the child sheet (selected by the client) may be displayed. In some embodiments, when a user clicks on the parent cell, the child sheet may be displayed automatically, e.g., in a new panel, tab, or window or in the same panel, tab or window as the parent cell. Interface elements (such as "back-to-parent" arrows or "back-to-child" arrows in a toolbar) allowing clients to move back and forth easily between child sheets and their parent cells may be implemented in at least some embodiments.

Example Sheet Hierarchy Application

Figure 4:
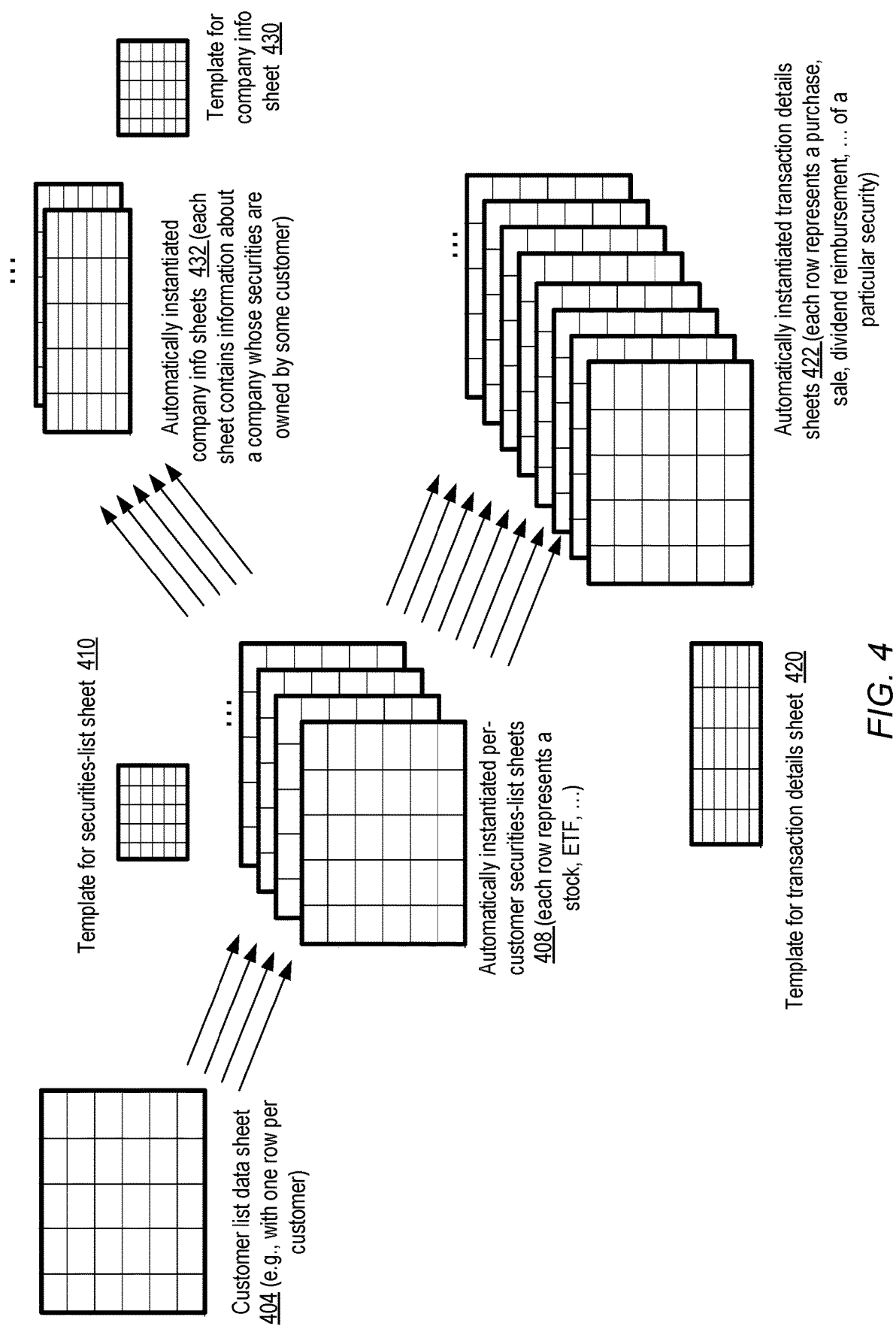
FIG. 4 illustrates an example scenario in which an account portfolio tracking application may be built using a multi-level hierarchy of automatically-generated sheets, according to at least some embodiments.

FIG. 4 illustrates an example scenario in which an account portfolio tracking application may be built using a multi-level hierarchy of automatically-generated sheets, according to at least some embodiments. In the depicted embodiment, a multi-layer hierarchy of data sheets may be used, with a customer list and summary information about the securities portfolios of various customers of the application being stored at a top-level customer list data sheet 404. One row of sheet 404 may be used for each customer in the depicted embodiment. Various columns of sheet 404 in a given customer's row may, for example, display the overall value of the portfolio, a graphical indication of the client's overall asset allocation mix, the overall year-to-date gain/loss, the current day's gain/loss, unrealized versus realized gains and losses, the date of the next scheduled automatic transaction of the client (if any), and so on.

Corresponding to each customer for whom a row is populated in data sheet 404, a respective child sheet 408 comprising a list of securities held by the customer may be created automatically. Each row of a given sheet 408 may comprise summarized information about an individual security owned by the customer, such as a stock, a bond, a mutual fund, an exchange traded fund, or the like. The summarized information may for example indicate the total number of shares/bonds, the current value, today's price change, year-to-date or lifetime performance where applicable, and so on. The securities list sheets 408 may be organized in accordance with a template 410 in the depicted embodiment, where the template may include various elements of metadata similar to those discussed in the context of FIG. 3.

Each customer represented in the portfolio tracking application may initiate various transactions over time for any given security holding. Details of the transactions associated with a given security of a given customer may be tracked using a respective automatically instantiated transaction details sheet 422 as a child sheet of the securities-list sheet, generated according to a template 420 in the depicted embodiment. Individual rows of a transaction details sheet 422 may represent, for example, a respective purchase transaction, a sale transaction, a dividend reimbursement transaction, a stock split transaction, and so on. Several different types of child sheets may be associated with a given parent sheet, or even with a given parent cell of a parent sheet, in various embodiments. For example, company information sheets 432 may also be created as child sheets of the securities-list sheets 408 in the depicted embodiment, in accordance with a template 430. Each such company information sheet may, for example, comprise arbitrary text, numeric, image, and other types of data in its cells, as needed. Any desired type of data may be stored in data sheets at various levels of the hierarchy in some embodiments —e.g., sheets may not necessarily be restricted to containing lists of records, or to any other specific data organization.

The fan-out between the different layers of a multi-layer hierarchy of sheets may be quite large in some embodiments, e.g., potentially resulting in the automated creation of thousands or tens of thousands of child sheets in some cases. In at least one embodiment, a visual overview of the hierarchy may be provided to a client, e.g., in response to a programmatic query, showing how many sheets have been set up at each layer, the total number of sheets, the total amount of data stored, and so on. The visualization may include interactive elements in some embodiments, enabling users to drill down into selected parent and/or child sheets as needed. In at least some embodiments, the visualization may be presented as a graph indicating various types of relationships, including hierarchical relationships, association relationships, data flow dependencies or relationships, and so on. A data flow relationship may indicate, for example, a scenario where an update to some set of cells is propagated to some other set of cells for use in a formula. In one embodiment, performance information (such as the volume of data that has flowed between related cells over some time interval) may also be included in such a graph-based visualization.

References Across Hierarchy Levels

FIG. 5 illustrates an example formula in which cells of a child sheet may be referenced via a parent cell, according to at least some embodiments. In the depicted embodiment, column K of a data sheet has been designated as a group of parent cells. In cell 505 in the $M^{th}$ Row and the $K^{th}$ column, a symbol 510 may be automatically displayed in the depicted embodiment, indicating that cell [KM] is a parent cell of a particular child sheet. As mentioned earlier, a variety of approaches may be taken in different embodiments to indicate that a cell is a parent cell or has a materialized child sheet; for example, the color (background or foreground) of the parent cell, the default font used for its contents, and/or a symbol like the diamond-shaped symbol 510 may be employed.

Contents of the child sheet may be referred to using the parent cell as a substitute for the name of the child sheet in at least some embodiments. For example, in formula 515 used for cell 506, the term=[KM][DN] represents the cell in column D and row N and of the child sheet associated with the parent cell at row M of column K. Other notations which refer to the parent cell may be used in some embodiments to refer to child sheet—e.g., instead of using=[KM][DN], a notation such as =KM![DN] or =KM..[DN] may be used. In at least some embodiments, references to the child sheet via the parent cell may occur in the parent sheet itself, the child sheet, or in some other sheet. It is noted that a client need not necessarily type in the parent cell's (column) identifier into a formula to refer to the child sheet in various embodiments; instead, if the client moves the cursor to the parent cell while inserting the formula, the (row, column) address may be automatically inserted into the formula.

Associations with Groups of Cells

Figure 6:
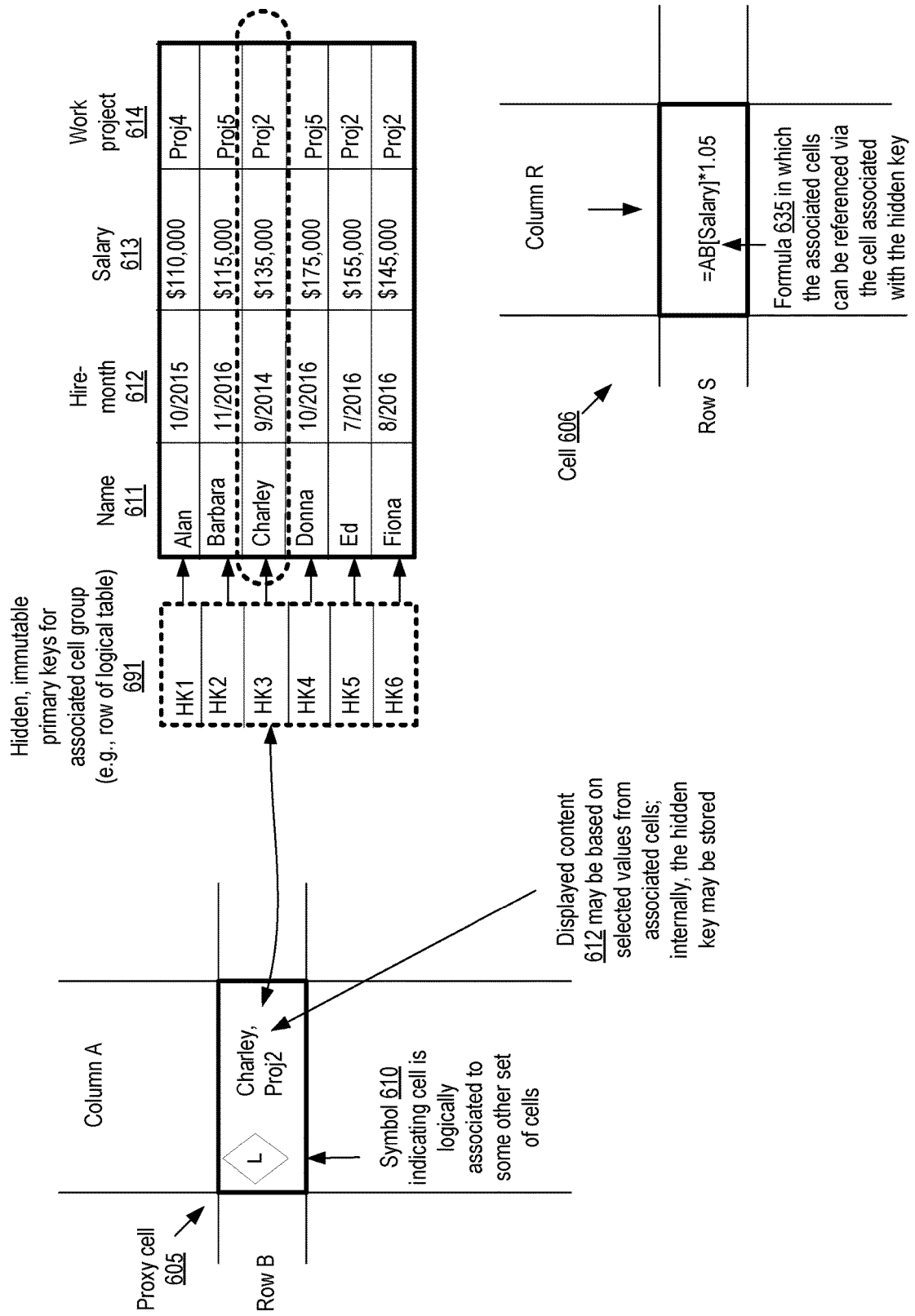
FIG. 6 illustrates an example of the use of immutable hidden primary keys to refer to groups of cells, according to at least some embodiments.

FIG. 6 illustrates an example of the use of immutable hidden primary keys to refer to groups of cells, according to at least some embodiments. In the depicted embodiment, a portion of a data sheet contains values for various attributes of six individuals, Alan, Barbara, Charley, Donna, Ed and Fiona. The name column 611 indicates the individual's name, the hire-month column 612 indicates the month in which the individual was hired at some organization, the salary column 613 indicates the individual's annual salary, and the work project column 614 indicates the primary project to which the individual is assigned in the organization. In some embodiments, a logical table may have been created in the data sheet, containing the values of these four attributes for these six individuals.

Figure 7:
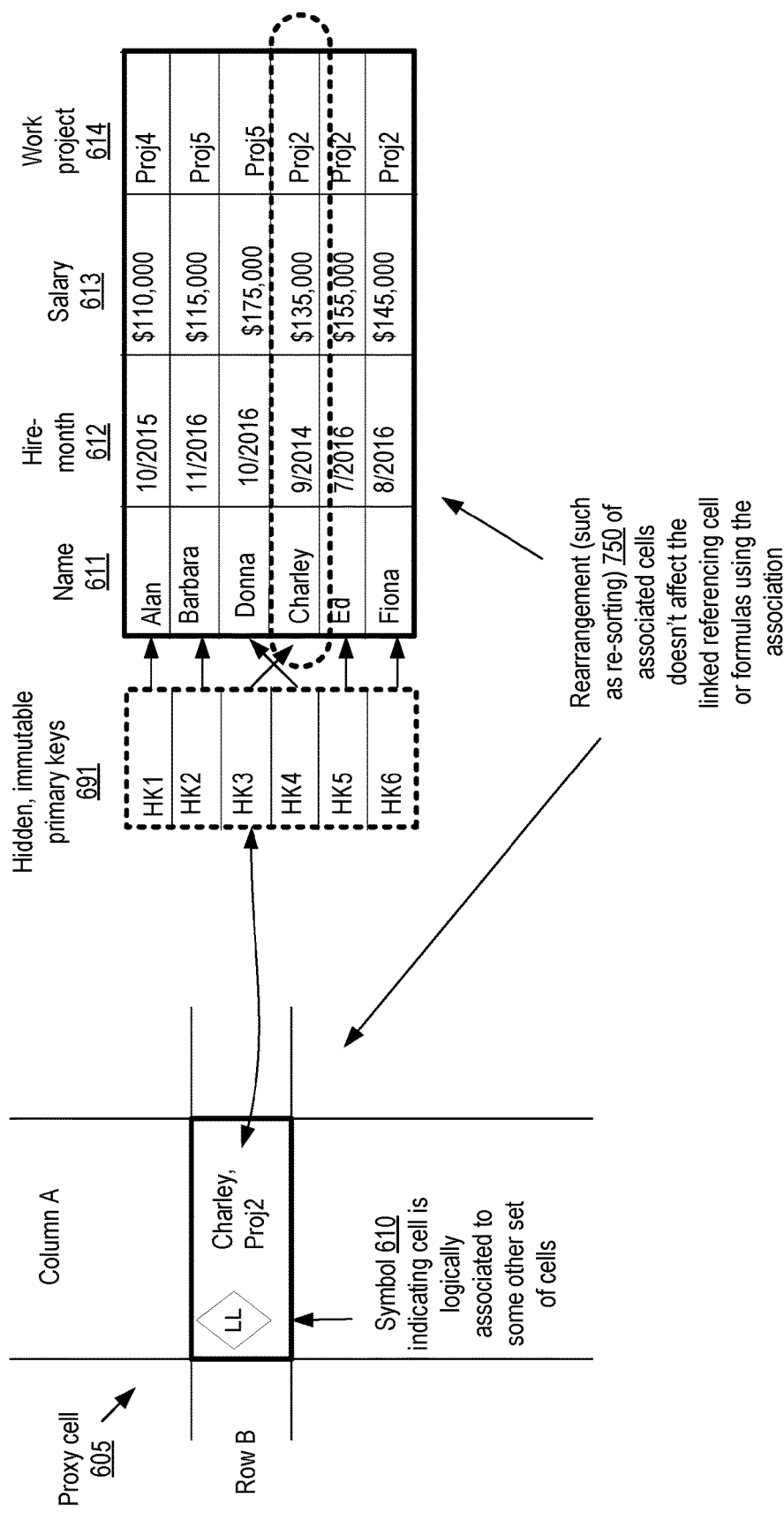
FIG. 7 illustrates an example scenario in which a group of cells for which a logical association has been defined may be rearranged without affecting formulas which refer to the cell used to represent the association, according to at least some embodiments.

In at least some embodiments, a logical association or link may be created, e.g., based on input from a client of the data management system, between a particular proxy cell 605 (such as the cell in row B of column A shown in FIG. 6) and a group of cells such as the four cells containing Charley's information. An immutable and invariant hidden object, such as a primary key HK3, may be used to represent the group of cells which are being associated with the proxy or reference-containing cell. In some embodiments, respective hidden keys 691 may be generated by the data management service for each of the rows of a logical table containing the values for name, hire-month, salary, and work project—e.g., HK1 may represent the group of cells containing Alan's information, HK2 may represent the group of cells containing Barbara's information, and so on. The objects or keys may be deemed immutable in the depicted embodiment because the logical link between the objects/keys and the cell groups may remain unchanged, even if the cells of the group are moved from their location, as indicated in FIG. 7 and discussed below in further detail. The objects/keys may be described as hidden in various embodiments because they may not be displayed to clients interacting with the data sheet. In other embodiments, the objects/keys may be displayed to clients upon request. A number of different approaches may be supported towards identifying the group of cells for which a proxy or row-link is to be set up. In some embodiments, input provided by a client via a search interface (e.g., a dynamic search-string-completion interface) may be used to identify the cell group. In the example scenario shown in FIG. 6, the client may type in the letters of the name Charley, e.g., "C", followed by "h", "a", "r", etc., and the data management service may provide search results that match the entered text, enabling the cell containing the name Charley to be selected as one of the associated cells.

Proxy cell 605 may, in effect, serve as a shortcut or link which can be used to access content of the associated cell group in the depicted example scenario. In at least some embodiments, the data management service may store the immutable key as the value of proxy cell 605, but the displayed content 612 may not necessarily comprise the key itself. Instead, in at least some embodiments, a label derived from the associated cell group (e.g., the label "Charley, Proj2", extracted from the name and work project columns) may be displayed. The specifics of the information to be displayed, and the format in which the information is to be shown, may be selected by the client on whose behalf the association proxy is generated (and/or other authorized clients, based on security settings) in some embodiments. For example, the client may indicate that the contents of the name column, followed by a comma, followed by the contents of the work project column, should be displayed. In at least some embodiments, a symbol 610 or some other visual signal (e.g., a background color, a border style, etc.) may be used to indicate that a cell such as cell 605 is logically linked to some other group of cells.

In the depicted embodiment, the notation=[AB][ Salary] may be used to refer to the value in the salary column in the cell group for which cell 605 (at row B of column A) is the proxy, as indicated in the formula shown in cell 606 at row S and column R. Other notations may be used in some embodiments for referencing associated cells indirectly—e.g., the notation=[AB][3] may be used to refer to the value in the third column of the associated cells. As in the discussion above regarding cursor-based formulas involving parent cells of a parent-child hierarchy, a client need not necessarily type in the proxy cell's (row, column) identifier into a formula to refer to the associated cells in various embodiments; instead, if the client moves the cursor to the proxy cell while inserting the formula, the (row, column) address may be automatically inserted into the formula. It is noted that an association using a proxy cell may be created to an arbitrary collection of cells, or to a whole data sheet, in various embodiments.

FIG. 7 illustrates an example scenario in which a group of cells for which a logical association has been defined may be rearranged without affecting formulas which refer to the cell used to represent the association, according to at least some embodiments. In contrast to the scenario depicted in FIG. 6, the positions of the rows containing Charley's and Donna's information have been interchanged—now, the information is in the order Alan-Barbara-Donna-Charley-Ed-Fiona instead of the original Alan-Barbara-Charley-Donna-Ed- Fiona. Such a rearrangement 750 may have occurred, for example, as a result of a re-sorting of the data, or for other reasons.

Despite the transfer of the logically associated cells containing Charley's information, the proxy cell 605 may continue to be linked to the same four cells in the depicted embodiment. Formulas that referred to the associated cells via the proxy cell may continue to work (and have the same results as prior to the change in the location of the associated cells). In some embodiments, the kinds of changes that can be performed on a group of associated cells (i.e., groups of cells for which a hidden immutable primary key has already been created) may be restricted—e.g., clients may not be permitted to insert columns among the associated cells, or to rearrange the positions of the associated cells relative to one another. Similarly, in some embodiments, some types of changes may not be permitted within a child sheet.

APIs for Uploading Data

Figure 8:
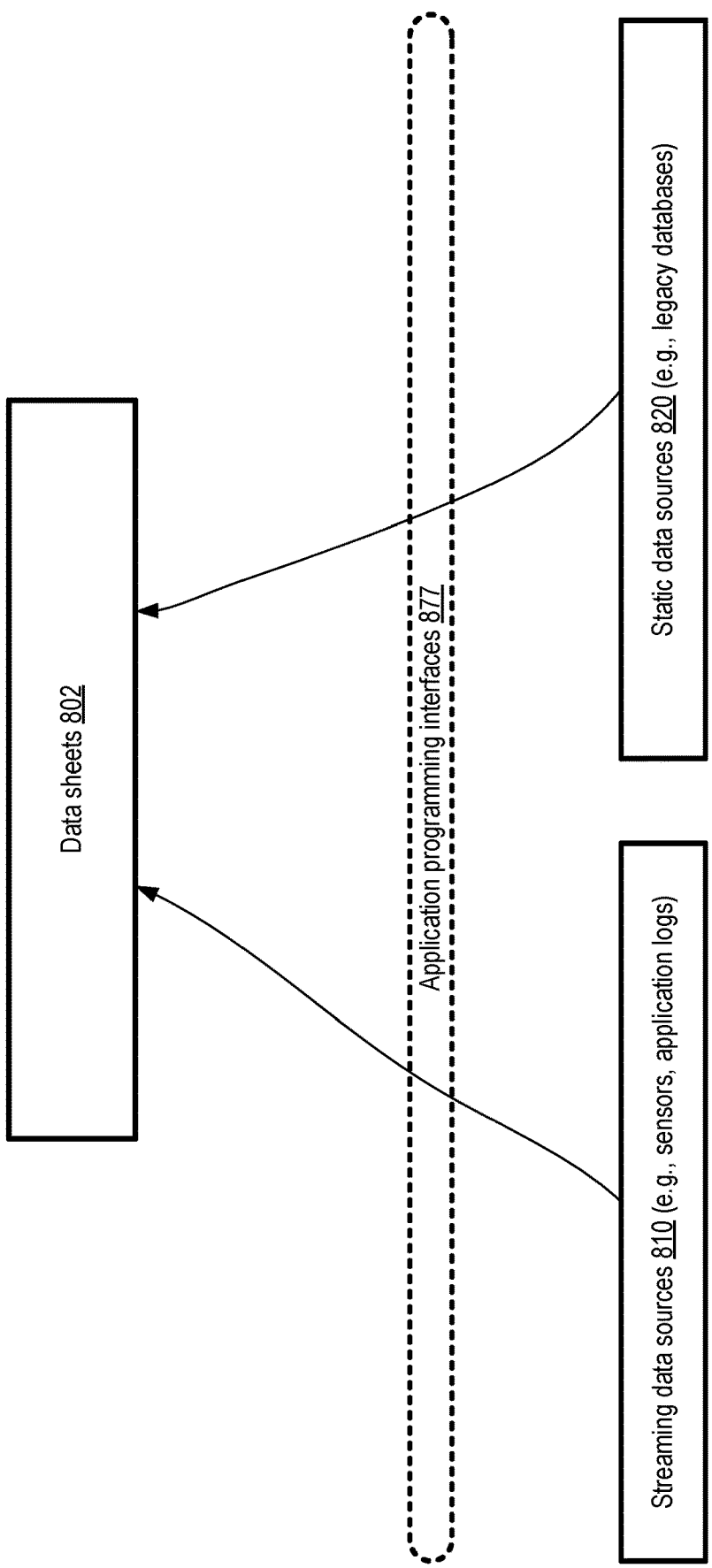
FIG. 8 illustrates examples of the use of application programming interfaces to populate data sheets, according to at least some embodiments.

As mentioned earlier, the data management service which supports the web of sheets data model may implement a variety of programmatic interfaces in some embodiments, including for example application programming interfaces, web-based consoles, and the like. FIG. 8 illustrates examples of the use of application programming interfaces to populate data sheets, according to at least some embodiments.

In the depicted embodiment, desired quantities of data may be uploaded into various data sheets 802 in one or more workspaces programmatically by invoking one or more APIs 877 of the data management service. Some of the APIs may be used to upload records generated by streaming data sources 810 such as sensors, application logs and the like in the depicted embodiment. Data stored in static data sources 820, such as legacy databases and the like, may also be uploaded into data sheets, e.g., using a different set of APIs of the service. A client may specify that some subset of the data is to be uploaded into child sheets, while other subsets of the data is to be uploaded as part of parent sheets in some embodiments. Similarly, proxy cells with logical associations to cell groups may also be set up programmatically as part of the API-based uploading process in various embodiments. In some embodiments, for example, an upload descriptor language may be defined by the data management service, enabling clients to specify rules indicating the destination cells, proxy cell locations, parent cell locations and the like for uploaded data.

Provider Network Environment

Figure 9:
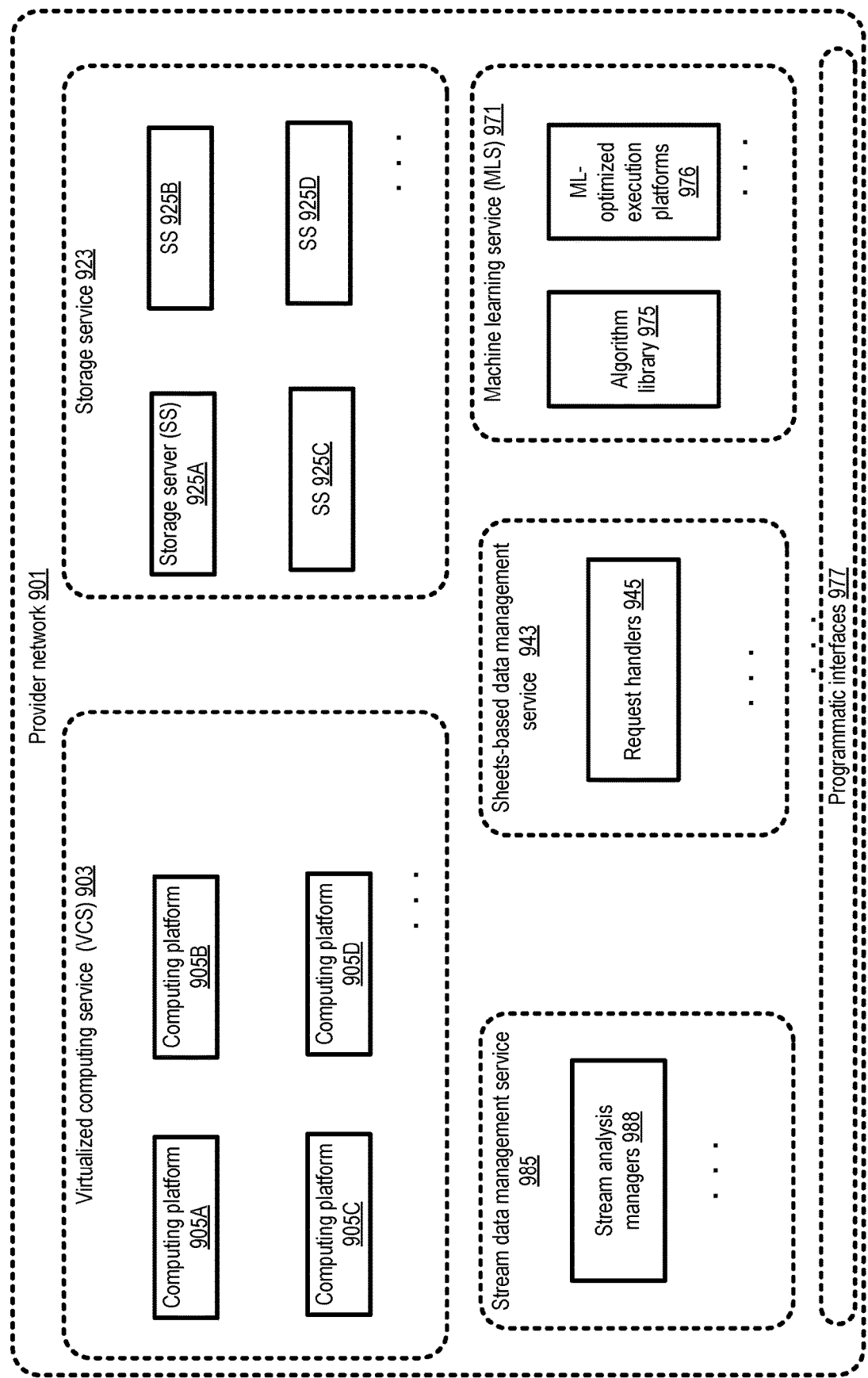
FIG. 9 illustrates an example provider network environment in which a data management service may be implemented, according to at least some embodiments.

As mentioned earlier, in some embodiments a data management service which supports the web of sheets data model may be implemented as part of a provider network. FIG. 9 illustrates an example provider network environment in which a data management service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network, or even a given service of a provider network, may in some cases be distributed across multiple data centers, which in turn may be distributed among numerous geographical regions (e.g., with each region corresponding to one or more cities, states or countries).

In the depicted embodiment, provider network 901 may comprise resources used to implement a plurality of services, including for example a virtualized computing service 903, a storage service 923, a machine learning service 971, a stream data management service 985, and a sheets-based data management service 943. Components of a given service may utilize components of other services in the depicted embodiment—e.g., for some machine learning tasks, a component of the machine learning service 971 may utilize virtual machines implemented at computing platforms such as 905A-905D of the virtualized computing service, the raw data and/or metadata for various data sheets managed using the data management service 943 may be stored at storage servers 925 (e.g., 925A-925D) of storage service 923, stream data records captured and processed at stream analysis managers 988 of stream data management service 985 may be stored at storage service and so on. Individual ones of the services shown in FIG. 9 may implement a respective set of programmatic interfaces 977 which can be used by external and/or internal clients (where the internal clients may comprise components of other services) in the depicted embodiment.

As shown, the sheets-based data management service 943 may comprise, among other components, one or more request handlers 945 in the depicted embodiment. The request handlers 945 may respond to client-submitted requests, enabling clients to create, populate, read, modify and delete various types of data sheets including sheets arranged in hierarchies and sheets with links to groups of cells as discussed earlier.

The sheets-based data management service may interact with one or more other services of the provider network in at least two ways in the depicted embodiment. First, resources of other services, such as computing platforms 905 or storage servers 925 may be used to perform some of the computations involved in sheet management, and/or to store sheet data or metadata. In some embodiments, processing associated with data sheets may be performed using virtual machines of VCS 903, while in other embodiments, non-virtualized machines or a combination of virtual and physical machines may be used. Similarly, any desired combination of virtualized or physical storage devices of storage service 923 may be used for sheets in various embodiments. In some embodiments, to enable fast processing of data in large sheet hierarchies, computing platforms with large amounts of main memory may be utilized, so that frequent memory-to-disk or disk-to-memory transfers are avoided. In some embodiments, a separate virtualized memory service may be implemented at the provider network 901 and used to support data sheets. The storage service 923 and/or the VCS 903 may each provide high levels of availability, data durability, and failure resilience, enabling workloads of a large collection of sheets customers to be handled in various embodiments.

In at least some embodiments, the sheets-based data management service 943 may also serve as an intermediary resource for analyzing and displaying data collected at other services. For example, records collected at the stream data management service 985 may be exposed to clients via data sheets, with the results of various types of stream analysis algorithms (such as anomaly detection algorithms) being shown to users via charts and other displays generated using data management service 943's functionalities. Similarly, the results of various types of machine learning algorithms 975, computed for example at machine-learning optimized execution platforms 976 (such as GPU-equipped servers) may be displayed via data sheets of the data management service 943 in various embodiments. Application programming interfaces of the kind discussed in the context of FIG. 8 may be used to transfer data from other services to the data management service in at least some embodiments. In various embodiments, the sheets-based data management service 943 may implement easy-to-use data connector interfaces, built on top of the service's application programming interfaces, to allow data generated at other provider network services and/or at various data sources of the public Internet to be transferred into data sheets.

In some embodiments, at least some of the techniques discussed above for managing sheet hierarchies, logical associations with groups of sheet cells, and the like may be accomplished using non-specialized computing platforms of the virtualized computing service 903. In some embodiments, the techniques for supporting the web-of-sheets data model may be implemented without acquiring resources of network-accessible services such as those shown in FIG. 9. For example, a standalone tool implemented at one or more computing devices which are not part of a network-accessible service may be used in some embodiments.

Methods for Supporting the Web-of-Sheets Data Model

Figure 10:
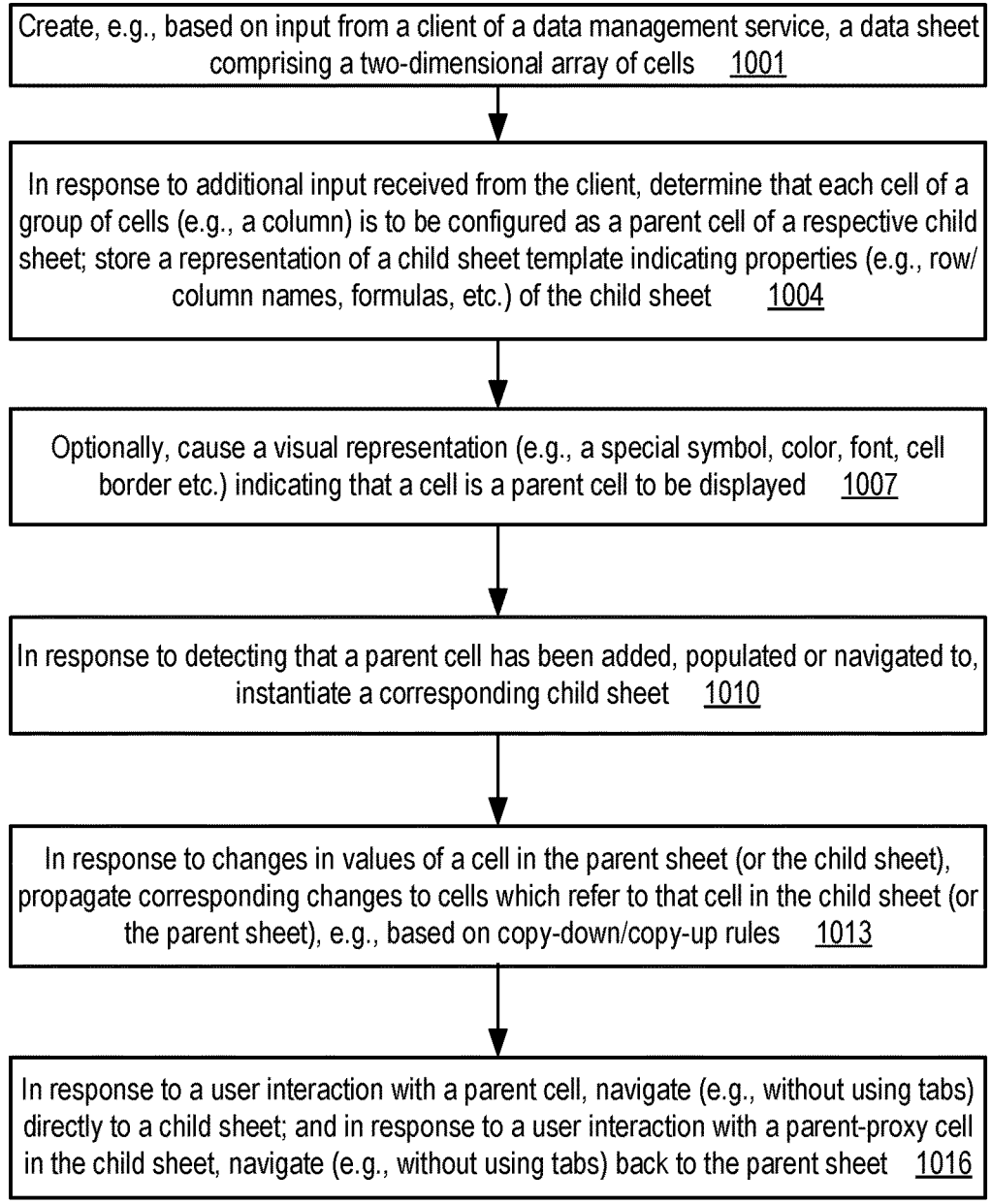
FIG. 10 is a flow diagram illustrating aspects of operations that may be performed to support automatic instantiation of child data sheets, according to at least some embodiments.

FIG. 10 is a flow diagram illustrating aspects of operations that may be performed to support automatic instantiation of child data sheets, according to at least some embodiments. As shown in element 1001, a data sheet comprising a two-dimensional array of cells may be created, e.g., in response to input received from a client of a network-accessible data management service of a provider network. The input may be provided from any of a variety of client-side devices such as a smart phone, a laptop, a tablet computing device, a desktop, and the like in various embodiments.

In response to additional input received from a client, a determination may be made that individual cells of a group of one or more cells of the data sheet (e.g., a column of a logical table) is to be designated or configured as a parent cell of a respective child sheet (element 904). Metadata pertaining to the child sheet, such as a template object indicating various properties of the child sheet, may be stored in a repository in some embodiments. The metadata may include, for example, names and/or formulas for various cells, security rules/permissions, and the like in various embodiments. It is noted that in at least some embodiments, the parent-cell-to-child-sheet relationship may be indicated by a client either by (a) first setting up an example child sheet and then designating one or more parent cells for which similar child sheets are to be created and/or by (b) first designating a parent cell and then providing information about a child sheet; thus, information about parent cells and child sheets may be provided in either order.

Optionally, a visual indication that a cell is a parent cell may be provided to clients (element 1007)—e.g., the data management service may cause the parent cell to include a particular symbol, or to have a particular color, font or border which designates its parent status in the depicted embodiment. In some embodiments, the fact that a particular data sheet is a child sheet may also or instead be indicated visually.

In response to detecting that a parent cell has been populated, added, or navigated to, a corresponding child sheet may be instantiated automatically in various embodiments (element 1010). In some embodiments, a lazy materialization strategy may be used, in accordance with which memory/storage for the cells of the child data sheet may not be allocated until the child data sheet is accessed, or until its parent cell is accessed. For example, in one embodiment, when the child data sheet is instantiated, a record indicating that the child sheet has been created may be stored, without storing values for individual cells of the particular child sheet. Later, when a value for a target cell of the child sheet is indicated, that value may be stored by the data management service. In at least one embodiment, after a child data sheet has been materialized, clicking on the parent cell of the child sheet may result in the contents of the child sheet being displayed.

Data updates (including, for example, addition of new values, modifications/deletions of existing values and the like) may be propagated in either direction (or both directions) between a child sheet and cells which refer to the child sheet via its parent cell in the depicted embodiment (element 1013). In some embodiments, the metadata stored for the parent-cell-to-sheet relationship may include, copy-down or copy-up rules indicating which cells' changes can be propagated from parent to child or vice versa. In various embodiments, portions of the parent sheet (the data sheet containing the parent cell) and/or the child sheet may be hidden and/or locked, preventing viewing or updates by entities allowed to view or update the other sheet in the hierarchical relationship.

The web-of-sheets model may also support an additional form of navigation among hierarchically related sheets in the depicted embodiment (element 1016). For example, in response to user input (such as a click) on a parent cell, as mentioned earlier, the corresponding child sheet may be displayed. In addition, in at least some embodiments, it may be possible to move back to the parent sheet from a child sheet by clicking on a parent-proxy cell in the child sheet. Unlike in some spreadsheet applications, clicking on tabs may not be required for such navigations in various embodiments (although tabs may be used if desired).

Figure 11:
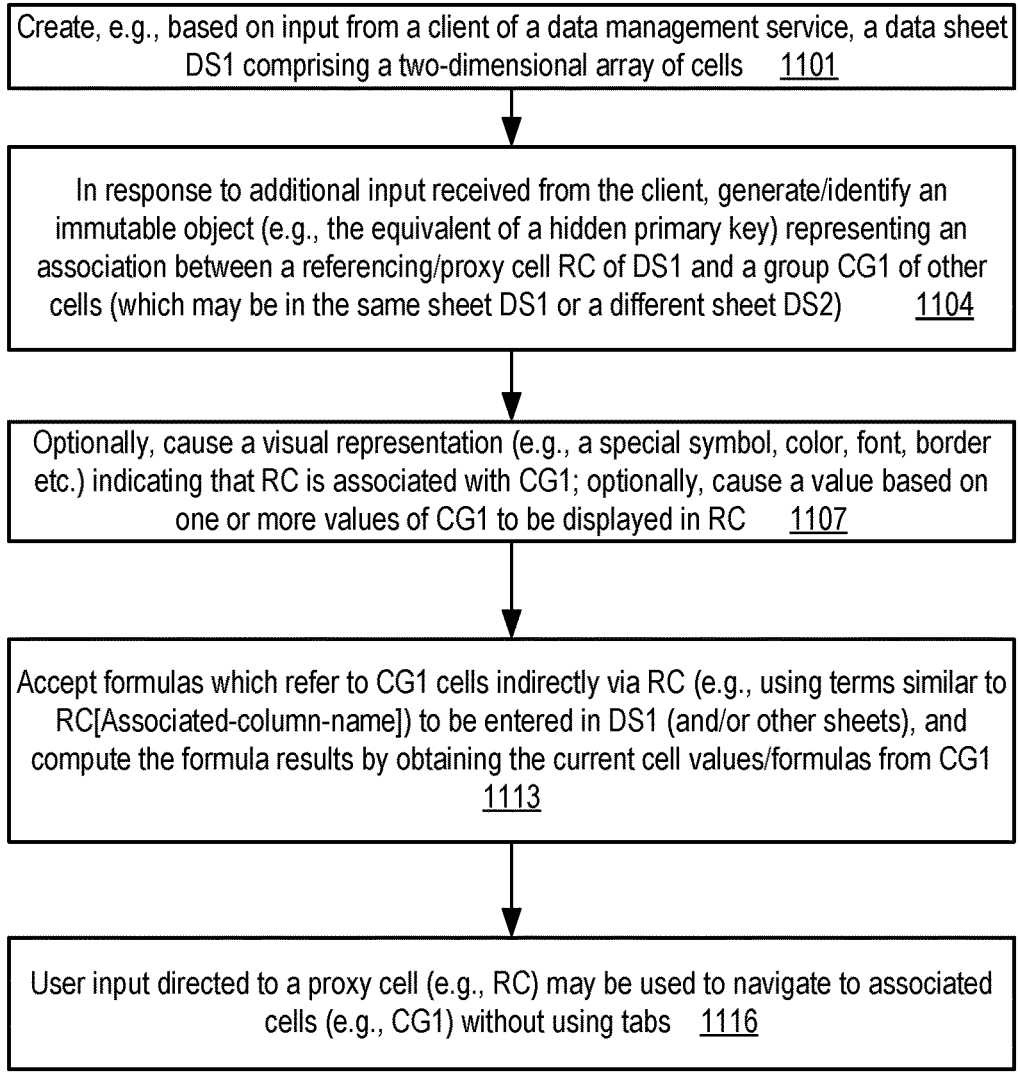
FIG. 11 is a flow diagram illustrating aspects of operations that may be performed to support associations between a given cell of a data sheet and a plurality of other cells, according to at least some embodiments.

FIG. 11 is a flow diagram illustrating aspects of operations that may be performed to support associations between a given cell of a data sheet and a plurality of other cells, according to at least some embodiments. As indicated in element 1101, a data sheet DS1 comprising a two-dimensional array or grid of cells may be created, e.g., at a network-accessible data management service of a provider network. The input may be provided from any of a variety of client-side devices such as a smart phone, a laptop, a tablet computing device, a desktop, and the like in various embodiments.

In response to additional input received from the client, an immutable object (e.g., the equivalent of a hidden primary key) representing an association between a referencing or proxy cell RC of DS1 and a group CG1 of other cells (which may be in the same sheet DS1 or a different sheet DS2) may be generated or identified in the depicted embodiment (element 1104). In some cases, for example, the group of other cells CG1 may already have a hidden primary key (e.g., as a result of the creation of a logical table); in other scenarios, a new immutable key or object may be created in response to the client's input indicating the desired logical association. The referencing cell RC may also be referred to as a row-link or a row-proxy cell in some embodiments, indicating its role as a proxy for the group of cells CG1.

Optionally, in some embodiments, a visual representation (e.g., a special symbol, color, font, border etc.) indicating that RC is associated with CG1 may be displayed (element 1107). The value or label displayed within RC may be based on one or more values of CG1 in some embodiments, e.g., in accordance with a default rule (such as a rule that the contents of the first or leftmost cell of CG1 are to be displayed in the referencing cell) or rules specified by the client.

After a record of the association between RC and CG1 has been stored, formulas which refer to CG1 cells indirectly via RC (e.g., using terms similar to RC[Associated-column-name]) may be entered in DS1 (and/or other sheets), and the corresponding formula results may be computed after obtaining the current cell values/formulas from CG1 in various embodiments. Even if the associated cells CG1 are moved to a different locations, the results of the formulas may remain unchanged and the row links may continue to function as they did prior to the move in the depicted embodiment.

As mentioned earlier, proxy cells may be used to navigate to the associated cell groups in various embodiments (element 1116). For example, clicking within a proxy cell such as RC may result in a navigation (e.g., a repositioning of a cursor) to, or at least a display of, the associated cells such as CG1.

It is noted that in various embodiments, some of the operations shown in FIG. 10 or FIG. 11 may be implemented in a different order than that shown in the figure, or may be performed in parallel rather than sequentially. Additionally, some of the operations shown in FIG. 10 and/or FIG. 11 may not be required in one or more implementations.

Use Cases

The techniques described above, of supporting a web-of-sheets model at a network-accessible data management service, may be useful in a variety of scenarios. Numerous small business owners or individuals who are not experts in database technology, or who do not necessarily require or wish to pay for high-end database systems, may manage their data sets using the familiar spreadsheet-like interfaces supported by such a service. Using functionality and formula languages of the kinds discussed above, associated with automatically-generated hierarchies of sheets and immutable links with selected groups of cells, a rich variety of scalable data management applications may be set up in various embodiments. The sheets may be populated as desired using the application programming interfaces for bulk or stream uploads supported by the service, enabling large amounts of data from a variety of sources to be managed efficiently.

Illustrative Computer System

Figure 12:
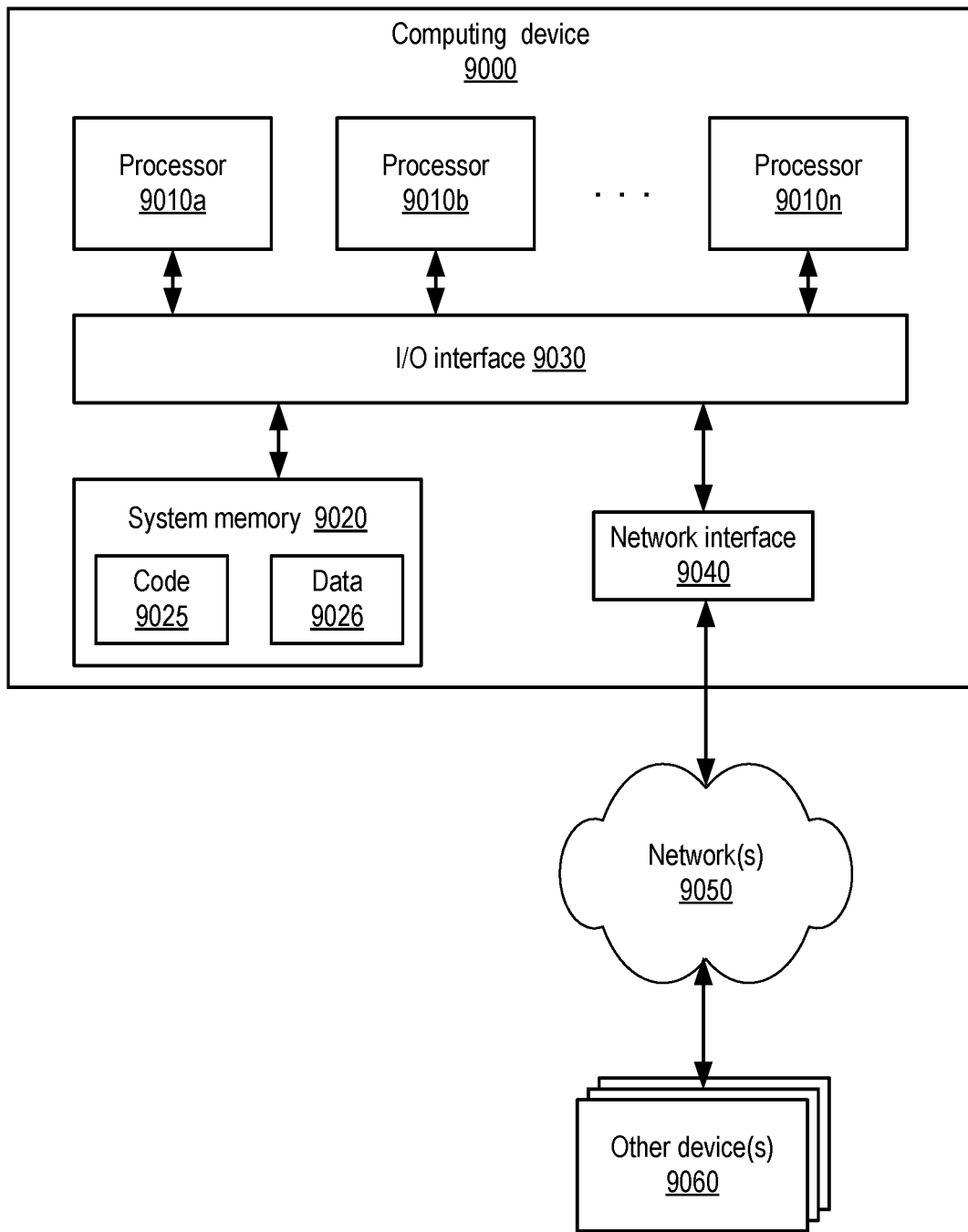
FIG. 12 is a block diagram illustrating an example computing device that may be used in at least some embodiments.

In at least some embodiments, a server that implements a portion or all of one or more of the technologies described herein, including the techniques for creating, populating, modifying and/or displaying contents of data sheets of a data management service may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 11 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method, comprising:
performing, by one or more computing devices of a network-accessible data management service:
storing a representation of a first child template associated with a parent group of one or more cells of a first data sheet, wherein the first data sheet comprises a two-dimensional grid of cells arranged in one or more rows and one or more columns, and wherein the first child template indicates one or more properties of a first child data sheet;
in response to detecting that a parent cell has been added to the parent group, creating at least a particular child data sheet in accordance with the first child template; and
in response to a change to a value in a first cell of the particular child data sheet, modifying a corresponding child-dependent value of a cell of the first data sheet.

2. The method as recited in claim 1, further comprising performing, by the one or more computing devices:
in response to detecting that the parent cell has been added to the parent group, initializing a second child data sheet as a child of the particular child data sheet.

3. The method as recited in claim 1, wherein creating the particular child sheet comprises storing a record indicating that the particular child sheet has been created, without storing values for individual cells of the particular child sheet, the method further comprising:
receiving, via a programmatic interface, after creating the particular child data sheet, an indication of (a) a target cell of the particular child data sheet, and (a) a value to be stored in the target cell; and
storing the value of the target cell.

4. The method as recited in claim 1, further comprising performing, by the one or more computing devices:
in response to determining that a client has indicated the parent cell via a programmatic interaction, causing a representation of at least a portion of the particular child data sheet to be displayed.

5. The method as recited in claim 1, wherein the first template comprises an indication of one or more security constraints associated with at least a portion of a child data sheet, the method further comprising:
verifying, prior to implementing an operation directed by a client to a portion of the child data sheet, that the one or more security constraints would not be violated by the operation.

6. The method as recited in claim 1, further comprising performing, by the one or more computing devices:
identifying a first immutable object representing an association between (a) a particular cell of the first data sheet and (b) a plurality of other cells of a particular data sheet;
in response to determining that a formula associated with a second cell of the first data sheet includes a reference to the particular cell corresponding to the first immutable object, compute a formula result to be displayed in the second cell, wherein the formula result is based at least in part on contents of one or more cells of the plurality of other cells.

7. The method as recited in claim 6, wherein the plurality of other cells comprises one or more cells of a particular row of a logical table, wherein the first immutable object comprises a key for the particular row.

8. The method as recited in claim 6, further comprising performing, by the one or more computing devices:
identifying, based at least in part on client input received via a programmatic interface, one or more source cells of the plurality of other cells whose content is to be used to determine a value displayed in the particular cell;
causing a value based at least in part on the content of the one or more source cells to be displayed in the particular cell.

9. The method as recited in claim 6, further comprising performing, by the one or more computing devices:
  identifying, based at least in part on input received from a client via a search interface, the plurality of other cells for which the immutable object representing the association is to be created.

10. The method as recited in claim 1, further comprising performing by the one or more computing devices:
  determining that a set of values has been received as a result of an invocation of an application programming interface for bulk upload of data to one or more data sheets; and
  storing, at one or more storage devices, the set of values and an indication of one or more cells to which the set of values correspond.

11. A system, comprising:
  one or more computing devices of a network-accessible data management service;
  wherein the one or more computing devices include one or more respective processors and store instructions that upon execution on the one or more processors cause the one or more computing devices to:
    store a representation of a first child template associated with a parent group of one or more cells of a first data sheet, wherein the first data sheet comprises a two-dimensional grid of cells arranged in one or more rows and one or more columns, and wherein the first child template indicates one or more properties of a first child data sheet;
    in response to detecting that a parent cell has been populated in the parent group, create at least a particular child data sheet in accordance with the first child template;
    in response to a change to a value in a first cell of the particular child data sheet, modify a corresponding value of a cell of the first data sheet;
    identify, based at least in part on input received from a client, a first immutable object representing an association between (a) a proxy cell of the first data sheet and (b) a plurality of other cells of a particular data sheet;
    in response to determining that a formula of a second cell of the first data sheet includes a reference to the proxy cell, compute a formula result to be displayed in the second cell, wherein the formula result is based at least in part on contents of one or more cells of the plurality of other cells.

12. The system as recited in claim 11, wherein instructions upon execution on the one or more processors cause the one or more computing devices to:
  in response to detecting that the parent cell has been populated, initialize a second child data sheet as a child of the particular child data sheet.

13. The system as recited in claim 11, wherein to create the particular child sheet, the instructions cause the one or more computing devices to store a record indicating that the particular child sheet has been created, without storing values for individual cells of the particular child sheet, wherein the instructions upon execution on the one or more processors cause the one or more computing devices to:
  receive, via a programmatic interface, after creating the particular child data sheet, an indication of (a) a target cell of the particular child data sheet, and (a) a value to be stored in the target cell; and
  store the value of the target cell.

14. The system as recited in claim 11, wherein the instructions upon execution on the one or more processors cause the one or more computing devices to:
  store metadata indicating a permitted direction of propagation of updates between the particular child data sheet and the first data sheet.

15. The system as recited in claim 11, wherein the instructions upon execution on the one or more processors cause the one or more computing devices to:
  cause, in response to determining that a query has been submitted via a programmatic interface, a graphical representation of one or more relationships among respective groups of cells to be displayed, including one or more of (a) the hierarchical relationship between the first data sheet and the particular child data sheet, (b) the association relationship between the proxy cell and the plurality of other cells or (c) data flow dependencies or relationships between cells of one or more data sheets.

16. A non-transitory computer-accessible storage medium storing program instructions that when executed on one or more processors cause the one or more processors to:
  generate, based at least in part on input received from a client of a data management service, a first immutable object representing an association between (a) a proxy cell of a first data sheet, wherein the first data sheet comprises a plurality of cells arranged in rows and columns and (b) a plurality of other cells at a location within a particular data sheet, wherein the association between the proxy cell of the first data sheet and the plurality of other cells within the particular data sheet remains unchanged after a change in the location of the plurality of other cells within the particular data sheet;
  in response to determining that a formula associated with a first cell of the first data sheet includes a reference to the proxy cell, compute a formula result, wherein the formula result is based at least in part on contents of one or more cells of the plurality of other cells; and
  cause the formula result to be displayed in the first cell.

17. The non-transitory computer-accessible storage medium as recited in claim 16, wherein the instructions when executed on one or more processors cause the one or more processors to:
  identify, based at least in part on client input received via a programmatic interface, one or more source cells of the plurality of other cells whose content is to be used to determine a value displayed in the proxy cell; and
  cause a value based at least in part on the content of the one or more source cells to be displayed in the proxy cell.

18. The non-transitory computer-accessible storage medium as recited in claim 16, wherein the instructions when executed on one or more processors cause the one or more processors to:
  identify, based at least in part on input received from a client via a search interface, the plurality of other cells for which the immutable object representing the association is to be identified.

19. The non-transitory computer-accessible storage medium as recited in claim 16, wherein the instructions when executed on one or more processors cause the one or more processors to:
  store a representation of a first child template associated with a parent group of one or more cells of the first data sheet, wherein the first child template indicates one or more properties of a first child data sheet;

in response to detecting that a parent cell has been added to the parent group, create at least a particular child data sheet in accordance with the first child template; and in response to a change to a value in a first cell of the first data sheet, modify a corresponding value of a cell of the first child data sheet.

20. The non-transitory computer-accessible storage medium as recited in claim 16, wherein the input is received via an interface of a mobile computing device.

\* \* \* \* \*